M. Day.
Domestic Spinning.
RX15
Related Doc No 15.
9692X
Fig: 2
Reissued Oct. 22, 1839.
Fig: 1
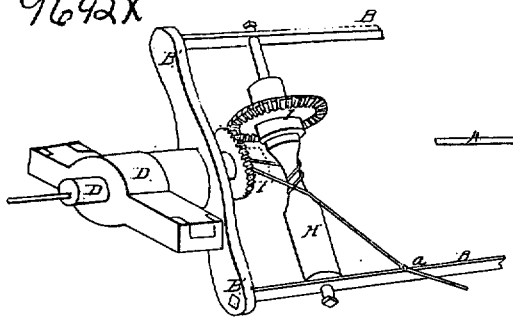
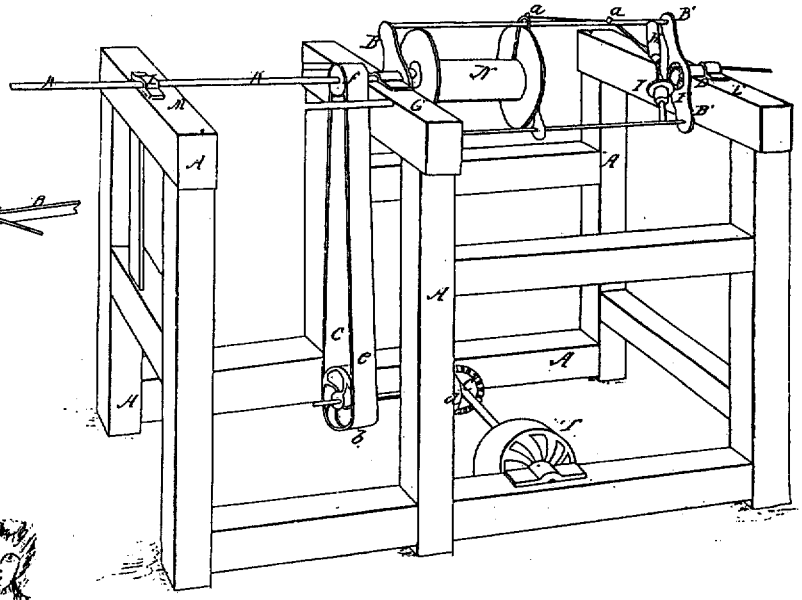
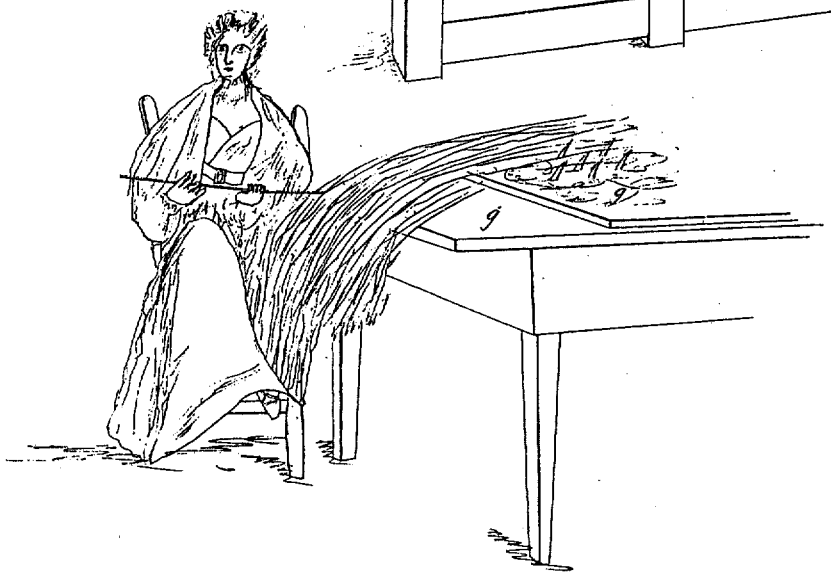
N. PETERS, PHOTO-LITHOGRAPHER, WASHINGTON, D. C.

RX 15

UNITED STATES PATENT OFFICE.

MOSES DAY, OF ROXBURY, MASSACHUSETTS.

IMPROVEMENT IN MACHINES FOR SPINNING HEMP, FLAX, AND MANILA GRASS.

Related Doc 9692

Specification forming part of Letters Patent dated June 2, 1836; Reissue No. 15, dated October 22, 1839.

*To all whom it may concern:*

Be it known that I, the undersigned, MOSES DAY, of Roxbury, in the county of Norfolk and State of Massachusetts, have invented, constructed, and applied to use a new and useful machine for spinning hemp, flax, and Manila grass, and winding or packing the same on a bobbin at one operation, which machine I call a "Hemp-Spinner," a full and exact description of the construction and operation of the same being hereto appended, which, taken in connection with the accompanying drawings, herein referred to, composes my specification.

The said machine is substantially the same as that for which I obtained Letters Patent, under the great seal of the United States, bearing date the 2d day of June, in the year of our Lord 1836. The said former Letters Patent I hereby surrender for this cause, that I am advised that the same may be inoperative or invalid, by reason of the former specification of said machine being defective or insufficient, and seeming to claim more than I intended or had a right to claim as my invention, which errors, if they exist, arose from inadvertence or mistake on the part of individuals employed by me to prepare the said description.

Figures 1, 2, and 3 of the accompanying plate of drawings represent my machine.

A A A A is the frame-work, to which the different parts of the machine are attached. B B B′ B′ is a flier the sides of which are formed of suitable iron rods or bars, the ends or heads B′ B′ being also of iron. On one side of the flier are two small iron pulleys, *a a*, suitably grooved on their peripheries. The end B′ B′ of the flier is represented on a larger scale in Fig. 2, and has a circular hole in the center, and is fitted so as to revolve on a shoulder, D, which is firmly fixed to the cross-bar E, and has on its end a stationary bevel-gear, F. (Shown in Figs. 1 and 2.) The other end of the flier is supported by a shoulder resting in a box on the cross-bar G. Each of these shoulders has a bore throughout its length, the one for the passage of the yarn and the other for the passage of the mandrel. Near one end of the flier is the capstan H H, formed of iron, and shaped as seen in the drawings. This capstan rests and turns easily on pivots suitably arranged in the sides of the flier, and is caused to revolve by a bevel-gear, I, Figs. 1 and 2, engaging with the bevel-gear F, before mentioned, so that it will readily be perceived that the revolutions of the flier will impart a rotary motion to the capstan in a direction at right angles to that of the flier.

In the bore of the fixed shoulder on which the end of the flier revolves is placed a small tube which revolves with the flier, and is of sufficient diameter to allow the hemp or yarn to pass to the capstan. Through the bore of the shoulder, at the opposite end of the flier, a spindle or mandrel, K K, passes, one end of which rests in the box L in the cross-bar M, in which it turns, and may move horizontally. At the other end of the spindle the bobbin N N is attached so as to move or revolve with the same. The mandrel is so arranged with the tube of the flier that it may revolve with greater or less rapidity, as occasion may require, to enable it to take up the yarn as the same is twisted by the flier. The movement of the mandrel may be regulated by friction applied in any proper manner.

Motion is communicated to the machinery by means of steam or other power applied to the drum at T, the axis of which has suitable bearings in the frame-work. Motion is imparted to the drum at *b* by the interposition of the bevel-gears *c d*, suitably arranged, which, by means of the bands *e e*, conveys the same to the pulley *f* on the axis of the flier, which drives the flier and mandrel.

The process of spinning is as follows: Upon a bench or table, *g g*, arranged with upright pins or teeth, like those of a common hatchel, is laid the hemp or other fibrous material to be spun, the teeth serving to keep the fibers straight, and also to hold back any surplus quantity which may not be wanted to form the yarn. The hemp passes through one hand of the operator, while the other regulates the quantity to be used, and after passing through the tube in the shoulder of the flier is wound one or more times round the capstan, (the revolutions of which draw it forward,) the twist being produced by the revolutions of the flier as the hemp passes to the capstan. From the capstan the thread is passed over the pulleys *a a* to the bobbin N N, on which it is wound or packed, the spindle and bobbin being retarded in the manner above described.

A reciprocating rectilinear motion may be imparted to the bobbin in any of the various modes adopted in spinning machinery.

What I claim as my invention is—

1. The combination of the capstan with the flier in such manner that the revolutions of the flier communicate motion to the capstan, as herein described, for the purpose of spinning rope yarns.

2. The combination of the stationary hatchel with the flier and capstan, so that while the two latter produce the necessary twist and carry it forward the former serves to straighten the fiber and hold the body of hemp back until required for use.

In testimony that the above is a true description of my invention I have hereto set my hand this 26th day of August, in the year 1839.

MOSES DAY.

Witnesses:
CALEB EDDY,
EZRA LINCOLN, Jr.